Patented Feb. 5, 1929.

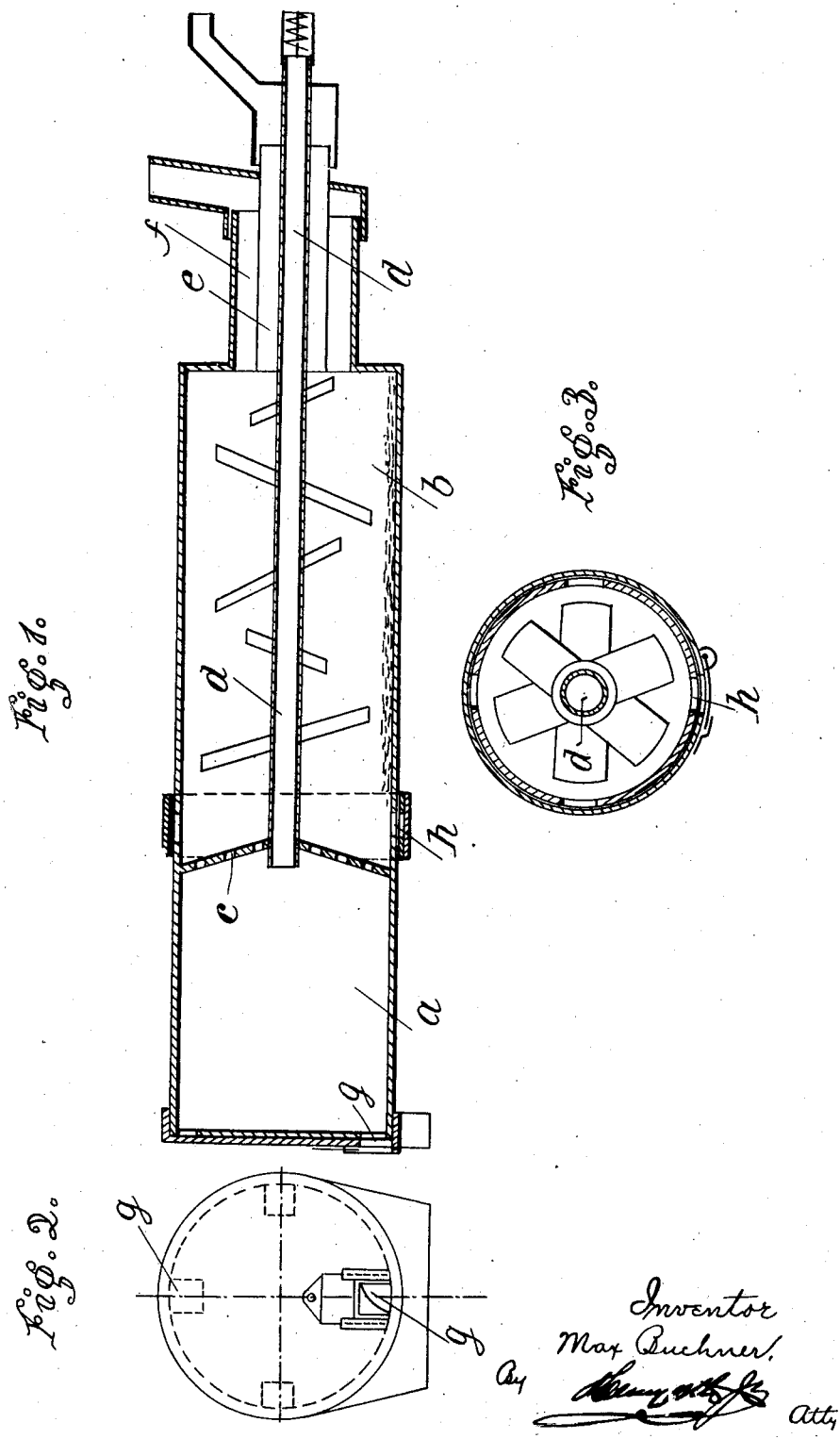

1,701,225

UNITED STATES PATENT OFFICE.

MAX BUCHNER, OF HANOVER-KLEEFELD, GERMANY, ASSIGNOR TO ALBERT FRITZ MEYERHOFER, OF ZURICH, SWITZERLAND.

PROCESS FOR THE PRODUCTION OF PURE HYDROFLUORIC ACID FROM POLLUTED FLUORSPARS.

Application filed January 5, 1926, Serial No. 79,470, and in Germany January 16, 1925.

Hydrofluoric acid is obtained by treating fluorspar with acids. As the fluorspars to be bought in commerce are very seldom pure silicon fluoride is obtained by the treatment with acids but the desired hydrofluoric acid also produced necessitates, according to the normally known process, difficult and troublesome refining proceedings.

This invention relates to the production of hydrofluoric acid from impure fluorspars and it has for its object to transform the entire amount of fluor contained in the inital material into hydrofluoric acid, if desired, in a most economical manner.

The invention consists in decomposing the gas mixture which has been liberated by means of acid from the impure fluorspar, and consisting of hydrofluoric acid and silicon fluoride and converting the hydrofluoric acid by means of fluorine compounds, on the one hand, into hydrofluoric salt, on the other hand, into free acid and in re-forming from the hydrofluoric salt obtained free hydrofluoric acid and/or the above stated desired fluorine compound.

According to the invention impure fluorspar is first decomposed, in a manner known per se, with an acid, for instance sulphuric acid, whereby silicon fluoride and hydrofluoric acid are liberated. This mixture is then treated with a fluoride, for instance barium fluoride. The silicon fluoride is bound, under formation of a complex fluoride, to the fluoride and, besides the complex fluoride, only hydrofluoric acid remains. The complex fluoride is preferably decomposed by heat whereby the fluoride is recuperated which is required in the preceding step of the process. At this separation silicon fluoride is obtained from which hydrofluoric acid can also be obtained. The silicon fluoride is preferably used for the production of any metal compound prior to the converting of its fluorine into hydroflouric acid. With the aid of the following equations a form of execution of this process is given, by way of example:

$$CaF_2 (\text{impure}) + H_2SO_4 = SiF_4 + 2HF$$
$$2HF + SiF_4 + BaF_2 = BaSiF_6 + 2HF$$
$$BaSiF_6 + \text{Heat} = BaF_2 + SiF_4$$
$$SiF_4 + 4NH_4OH = Si(OH)_4 + 4NH_4F$$
$$4NH_4F + 2CaSO_4 = 2(NH_4)_2SO_4 + 2CaF_2$$
$$2CaF_2 + 2H_2SO_4 = 2CaSO_4 + 4HF$$

The silicon, which is present in the silicon fluoride obtained by the decomposition of the silico fluoride, can be more or less converted into silica. With this object in view the silicon fluoride may be treated with bases. It is for instance added to a solution of sodium hydroxide and in this manner silico fluoride, hydrofluoric acid and silica are obtained. The silico fluoride may be decomposed again by heat, so that a fluoride is obtained which may be utilized for the production of other combinations, whilst the silicon fluoride, which has been liberated again, is worked up in another manner. The following equations represent such a working process and explain at the same time the production of nitrate by intermediary reactions.

$$2SiF_4 2NaOH = Na_2SiF_6 + 2HF + SiO_2$$
$$Na_2SiF_6 + \text{Heat} = 2NaF + SiF_4$$
$$2NaF + Ca(NO_3)_2 = 2NaNO_3 + CaF_2$$
$$CaF_2 + H_2SO_4 = CaSO_4 + 2HF$$

As silicon fluoride is continuously formed from the impure fluorspar, so that in the course of the process silicon fluorides are continuously formed anew, part of the silicon fluoride as well as the fluoride, from the reactions for the production of other combinations, may be utilized for the re-building of silicon fluoride and in a part of the cycle the production of other combinations, for instance, nitrates, phosphates, sodium carbonate, &c., with the production of sodium carbonate also ammonia and the like, can be carried out continuously.

The new process permits of adaptation to the conditions determined by the composition of the fluorspar utilized as initial material. If the fluorspar contains a large percentage of silica, e. g. silicon fluoride is formed in greater quantities during the acid decomposition of the fluorspar and, the silicon contained in the silicon fluoride will be transformed as far as possible into silica, or silicon fluoric acid is formed from the same in addition to silica and, eventually also only silica. The reactions take place according to the following equations:

$$SiF_4 + 4NaOH = 4NaF + Si(OH)_4$$

or $$3SiF_4 + 2H_2O = 2H_2SiF_6 + SiO_2$$

or $$SiF_4 + H_2F = H_2SiF_6$$

Highly voluminous silica very capable of reaction is obtained if the silicon fluoride is caused to act with steam alone or in presence of gases and vapours. The addition of gases or vapours of any kind serves for the purpose of lowering the concentration of the steam. Air is preferably used for this purpose with the aid of which the water is for instance atomized. The same effect, the formation of highly voluminous silica very capable of reaction, is obtained also when the decomposition of silicon fluoride with water, which by the way leads to the formation of silicon fluoric acid, is carried out in presence of silica. The silicon fluoride is introduced into silico fluoric acid and produces in this manner highly concentrated silico fluoric acid besides silica.

The production of silico fluoric acid from silicon fluoride and hydrofluoric acid may be effected in such a manner that the silicon fluoride is added directly to the gas mixture resulting from the acid decomposition of the fluorspar. There exist many possibilities of use for the silico fluoric acid obtained; it may either be used for the formation of other metal combinations, or as disintegrating means for instance for clays, phosphates and the like.

Another way of reacting on the gas mixture which has been formed by the decomposition of the impure fluorspar consists in making fluoride and silico fluoric acid with the aid of silico fluorides. From the silico fluoric acid formed the silico fluoric acid salt is reformed to any extent, the silico fluoric acid being preferably utilized for the production of other combinations.

For explanation may serve the following equations:

$$4HF + SiF_4 + CaSiF_6 = CaF_2 + 2H_2SiF_6$$
$$ZnO + H_2SiF_6 = ZnSiF_6 + H_2O$$
$$ZnSiF_6 + 2NaCl = Na_2SiF_6 + ZnCl_2$$
$$Na_2SiF_6 + Heat = 2NaF + SiF_4$$
$$2NaF + CaCO_3 = Na_2CO_3 + CaD_2$$
$$CaF_2 + SiF_4 = CaSiF_6$$

The reaction upon the gas mixture by means of the silico fluoric acid salts is especially advisable if the proportion of silica in the fluorspar is very high. It may be mentioned that the insoluble fluoride formed in the course of the process, as expressed in the equations, for instance the calcium fluoride from which, if desired, by means of acid pure hydrofluoric acid can be made, is obtained in a form which is extremely capable of reaction.

The production of carbonates and hydroxides with utilization of the fluorides obtained in the process is especially important for the production of metal combinations. If an alkali fluoride has been obtained from the decomposition of the silico fluoride by heat it can be reacted upon with insoluble carbonates and hydroxides, whereby soluble carbonates and hydroxides are obtained.

$$2NaF + CaCo_3 = Na_2Co_3 + CaF_2$$
$$2NaF + Ba(OH)_2 = 2NaOH + BaF_2$$

There is also no difficulty in carrying out the process so that alkali fluoride is obtained, as the silico fluoric acid in free state and in the form of its constituents or building-up elements is at disposal in sufficient quantity and as the binding of the silico fluoric acid to an alkali can be effected easily.

The reaction which is carried out for the formation of certain combinations can be carried out not only with the fluorides, which are obtained by the decomposition of the silico fluoride, but also directly with the silico fluoride. The silico fluoride is brought to reaction for instance with a salt or with an acid as expressed by the following two equation-examples:

$$Na_2SiF_6 + CaCO_3 = Na_2CO_3 + CaSiF_6$$
$$CaSiF_6 + H_2SO_4 = CaSO_4 + H_2SiF_6$$

or $$PbO + H_2SiF_6 = PbSiF_6 + H_2O$$
$$3PbSiF_6 + 2H_3AsO_4 = Pb_3(AsO_4)_2 + 3H_2SiF_6$$

The latter example shows already a manner of producing a special silico fluoric acid salt as is required for obtaining of a certain metal compound, in the present case of the lead arsenate. Other possibilities for the formation of the silico fluoric acid salts consist in that either the silico fluoric acid is built up by means of acid from an insoluble fluoride and silicon fluoride separated in the course of the process and in forming from this silico fluoric acid the desired salt, or by reacting with a fluoride, whether soluble or insoluble, and silicon fluoride or silica in presence of acid and of a salt. The salt which is introduced is a salt which contains the base to be bound to the silico fluoric acid. If one works with silicon fluoride only small quantities of acid acting as contact substance need be employed. In this case one may work quite without acid. For the production of silico fluoric acid in the manner described the following equation may serve:

$$CaF_2 + SiF_4 + H_2SO_4 = CaSO_4 + H_2SiF_6$$

The direct formation of a silico fluoric acid salt from fluoride, silica, eventually salt and acid is carried out in the following manner:

$$6KF + SiO_2 + 4HCl = K_2SiF_6 + 4KCl + 2H_2O$$
$$2KF + SiO_2 + 2CaF_2 + 4HCl =$$
$$K_2SiF_6 + 2CaCl_2 + 2H_2O$$

If the silicon has to be introduced as fluoride one proceeds as follows:

$$2KCl + SiF_4 + CaF_2(acid) =$$
$$K_2SiF_6 + CaCl_2(acid)$$

The bracket (acid) indicates that only small quantities of acid are required as contact substance or that the acid may be quite omitted.

With the production of hydrofluoric acid from impure fluorspar the production of any desired complex hydrofluoric acids or of the salts of the same may be combined. Boron hydrofluoric acid, zirconium hydrofluoric salts or titanium hydrofluoric salts and the like may be produced.

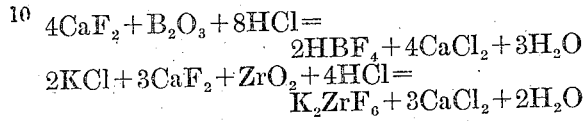

The several reactions, which form the steps of the process, may be carried out at higher temperature and eventually under pressure. One may work further in concentrated solution or only with small quantities of solvents which are not sufficient for dissolving, or use salts in solid state.

The treatment of the impure fluorspar with acid, and the decomposition of the gas mixture into free acid and a salt is preferably carried out in a heatable and rotatable cylinder with two chambers. The first chamber is charged continuously with the mixture of fluorspar and acid, and the residue is removed from time to time. The partition which separates the two chambers is perforated so that the gas mixture generated, consisting of hydrofluoric acid and silicon fluoride, can flow over into the second chamber. This second chamber is preferably charged, in using insufficient quantities of solvents, with the fluoride or silico fluoride designed for the treatment of the gas mixture. According to the manner in which the heating of the rotatable cylinder is regulated the free acid separated or formed in the second chamber can be delivered from the chamber in gaseous state or withdrawn from the chamber, together with the salt which has been formed, in dissolved state. The emptying of the second chamber is carried out independently of the first chamber and at any desired time.

The accompanying drawing shows such a cylinder in longitudinal section. $a$ and $b$ are the two chambers, $c$ is the perforated partition, $d$ is the supply tube for the mixture of fluorspar and acid. The salt designed for the treatment of the gas mixture is admitted through $e$, and $f$ serves as outlet for the pure hydrofluoric acid or for the silico hydrofluoric acid in gaseous state. At $g$ traps for the emptying of the chamber $a$ are arranged. $h$ are the emptying traps for the chamber $b$. Baffle plates or stirrers $i$ may be arranged in the chamber $b$ on the inlet pipe $d$ and designed to force the gas mixture to flow to the actually lowest portion of the rotating cylinder.

The fluorspar and acid mixture is supplied to chamber $a$ through pipe $d$. The resulting gaseous reaction products pass through the perforated partition $c$ into chamber $b$. The solid reaction product, mainly calcium salt, is discharged through the openings $g$.

In chamber $b$ the gaseous hydrofluoric acid and silicon fluoride is supplied with a simple fluoride or a complex fluoride through pipe $e$, to bind the silicon fluoride as a complex fluoride, which latter is discharged through openings $h$, while the pure hydrofluoric acid passes out through pipe $f$.

I claim:

1. The art of producing pure hydrofluoric acid from impure fluorspar, which comprises reacting on impure fluorspar with an acid capable of forming a gas mixture of hydrofluoric acid and silicon fluoride, reacting on said mixture with a fluorine compound to form a fluoride, and reacting on the fluoride so formed with a compound capable of forming a fluorine compound for reaction on the gas mixture and a free fluoric acid.

2. The art of producing pure hydrofluoric acid from impure fluorspar, which comprises reacting on impure fluorspar with an acid capable of forming a gas mixture of hydrofluoric acid and silicon fluoride, binding the silicon fluoride in the mixture by means of a simple fluoride to form complex fluoride, decomposing the complex fluoride into a simple fluoride for return into the cycle of operations and silicon fluoride, and reacting on the silicon fluoride with a suitable substance to produce a fluoric acid.

3. The art of producing pure fluoric acid from impure fluorspar, which comprises reacting on impure fluorspar with an acid capable of forming a gas mixture of hydrofluoric acid and silicon fluoride, binding the silicon fluoride to a simple fluoride to form a complex fluoride, decomposing the complex fluoride into simple fluoride for reaction with said gas mixture and reacting on the silicon fluoride with a reagent to form a fluoric acid.

4. The art of producing a pure fluoric acid, which comprises reacting upon impure fluorspar with an acid capable of forming a gas mixture of hydrofluoric acid and silicon fluoride, reacting on the mixture with a complex fluoride to form a simple fluoride and a complex fluoric acid, forming a soluble fluoride of such acid, reacting on such fluoride with a reagent capable of forming an insoluble complex fluoride and a soluble salt, recovering silicon fluoride from the complex salt and reacting on the latter with a simple fluoride to form a complex fluoride for reaction with the gas mixture.

5. The art of making a pure fluoric acid from impure fluorspar, which comprises reacting thereon with an acid capable of forming a gas mixture of hydrofluoric acid and silicon fluoride, reacting upon the mixture with a silicon fluoride and obtaining a simple fluoride and silico-fluoric acid, and reacting on the latter with a mineral acid to produce pure hydrofluoric acid and silicon fluoride, reforming the silico-fluoride from the silicon fluoride for treatment of the gas mixture and additional silicon fluoride for the production of other compounds.

6. The art of producing a pure fluoric acid, which comprises reacting on impure fluorspar with an acid insufficient to dissolve the same in the presence of heat to form a gas mixture of hydrofluoric acid and silicon fluoride, treating the gas mixture with a fluoride to form a complex fluoride and hydrofluoric acid, converting the complex fluoride into the fluoride for the treatment of the gas mixture and silicon fluoride, and reacting upon the silicon fluoride with a reagent capable of forming a fluoric acid.

7. The art of producing pure hydrofluoric acid from fluorspar containing silicon as an impurity, which comprises reacting on such impure fluorspar with a mineral acid to form a gas mixture of hydrofluoric acid and silicon fluoride, binding the silicon fluoride content of the mixture by another simple metal fluoride to a complex fluoride and recovering pure hydrofluoric acid, decomposing the complex fluoride into a simple metal fluoride and silicon fluoride, reacting on the silicon fluoride with a suitable reagent to separate silicon and bind the fluorine to another base, and reacting on the resulting fluoride with suitable substances to liberate the fluorine heretofore bound to silicon as hydrofluoric acid.

In testimony that I claim the foregoing as my invention, I have signed my name.

Dr. MAX BUCHNER.